Aug. 25, 1925.                                                1,551,117
                        I. E. PINE
              DIRIGIBLE HEADLIGHT FOR AUTOMOBILES
             Filed Feb. 21, 1925      2 Sheets-Sheet 2
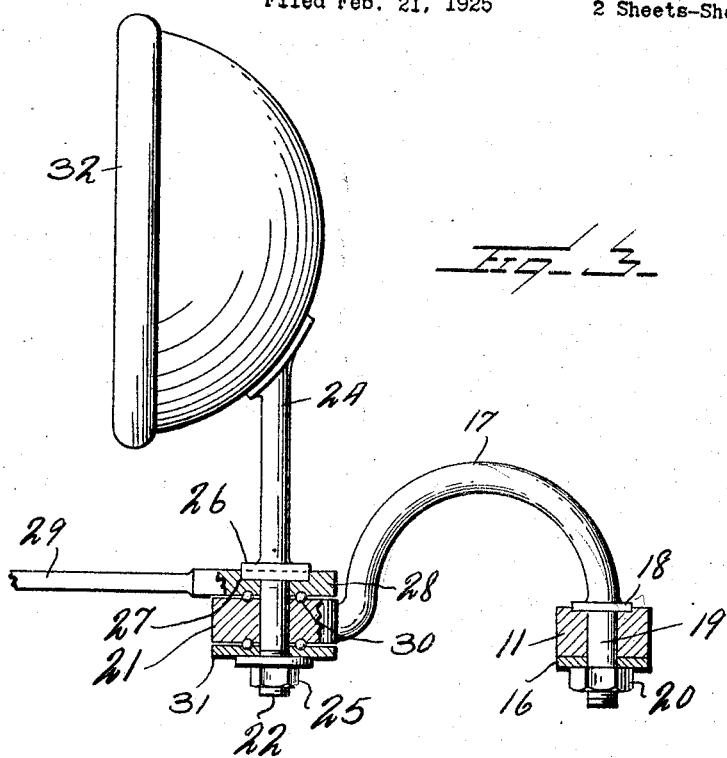
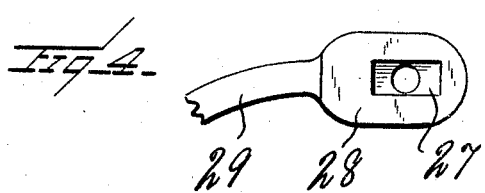
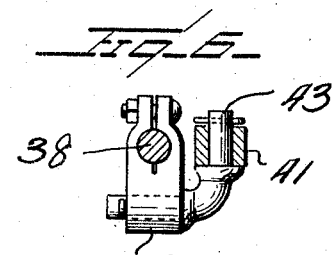
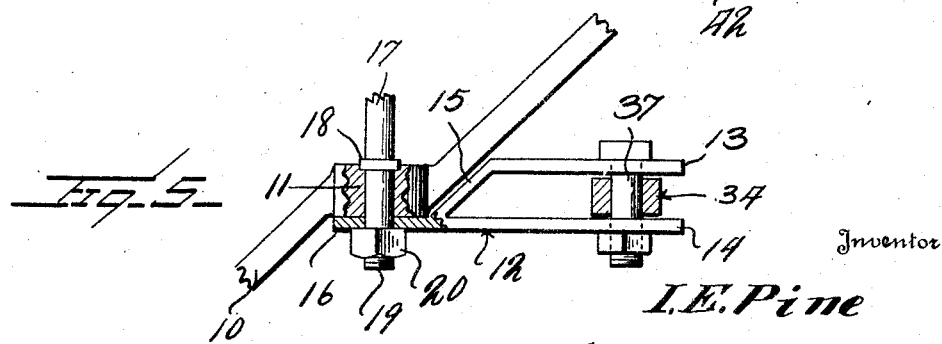
Inventor  
I. E. Pine  
By Watson E. Coleman  
Attorney Patented Aug. 25, 1925.

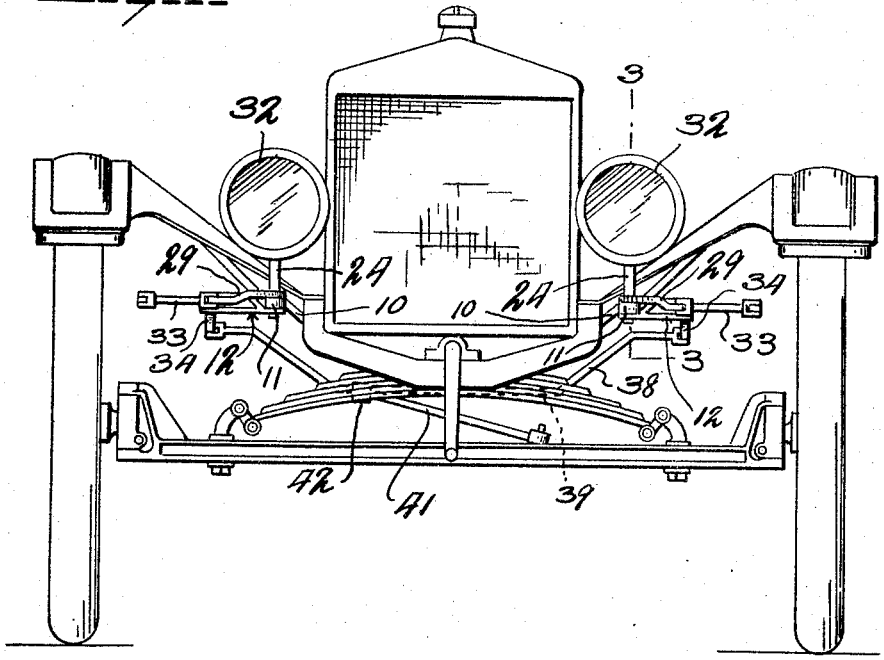
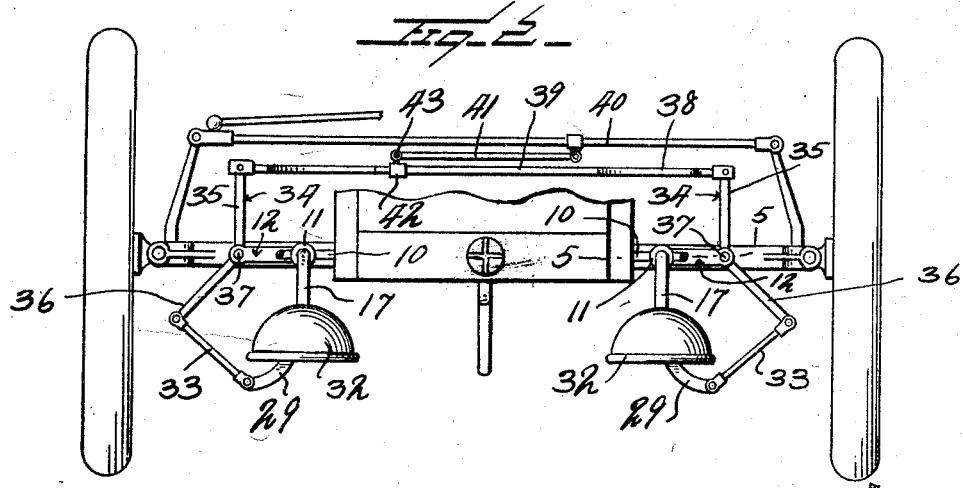
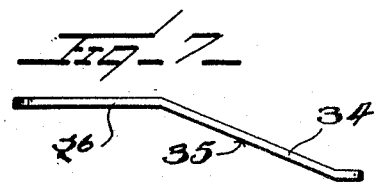

1,551,117

UNITED STATES PATENT OFFICE.

IRA E. PINE, OF COALTON, OHIO.

DIRIGIBLE HEADLIGHT FOR AUTOMOBILES.

Application filed February 21, 1925. Serial No. 10,892.

*To all whom it may concern:*

Be it known that I, IRA E. PINE, a citizen of the United States, residing at Coalton, in the county of Jackson and State of Ohio, have invented certain new and useful Improvements in Dirigible Headlights for Automobiles, of which the following is a specification, reference being had to the accompanying drawings.

This invention relates to dirigible headlights for automobiles, and the general object of the invention is to provide a dirigible headlight which is more positively controlled than other dirigible headlights known to me.

A further object is to provide a device of this character in which the lights turn with the wheels and reflect the rays of light directly in front of the wheels at all angles, thus fully illuminating the road toward which the car is going, whether this road is straight or curved.

A still further object is to provide a construction of this character which, while particularly designed for Ford automobiles, is also adapted to be used in connection with other makes of automobiles and which may be adjusted to suit a variety of different circumstances of operation and construction.

My invention is illustrated in the accompanying drawings, wherein:—

Figure 1 is a front elevation of an automobile with my improved dirigible headlight applied thereto;

Figure 2 is a fragmentary top plan view of the structure shown in Figure 1;

Figure 3 is a section on the line 3—3 of Figure 1;

Figure 4 is a fragmentary top plan view of the lever 29;

Figure 5 is a fragmentary sectional view on the line 5—5 of Figure 2;

Figure 6 is a detail elevation of the universal joint used between the connecting rods, the rods being in section;

Figure 7 is a side elevation of the lever 34.

Referring to these drawings, it will be seen that I have illustrated so much of an automobile as is necessary to an understanding of my invention, and that in these drawings 10 designates the usual fender brace and headlight bearing of an automobile, this fender brace extending downwardly and transversely of the car, then extending horizontally, as at 11, and again extending downwardly. The standard headlight support is usually mounted upon this horizontal portion 11.

My invention contemplates the use of a bracket 12 which is forked to provide upper and lower webs 13 and 14, as illustrated in Figure 5, this bracket being formed beyond the inclined face 15 with a horizontal portion 16 which is disposed immediately below the horizontal portion 11 of the fender brace 10. Mounted in the horizontal portion 11 is an upwardly curved, approximately semi-circular arm 17. The end of the arm which extends through the fender brace is formed with a shoulder 18 and with a stem 19 which extends through the portion 11 and through the web 16 of the bracket 12, and engaging these screw-threads is a nut 20 which will hold this bracket or arm 17 in fixed position.

The opposite end of the arm or bracket 17 is formed to provide a horizontal portion 21, this horizontal portion being formed with a vertical bearing 22 through which the spindle 23 passes, this spindle being connected to the reflector post 24. The lower end of this spindle or stem 22 is screw-threaded and carries the nut 25. The post 24 is provided with a rectangular-shaped shoulder 26 adapted to fit within a rectangular recess 27 formed in the upper face of the enlarged terminal end 28 of a lever 29. The head 28 of this lever rests upon ball bearings 30 carried in a race formed in the upper face of the horizontal portion 21. Between the nut 25 and the under face of the horizontal portion 21 is disposed a washer 31 which bears against a lower set of ball bearings and which is operatively engaged by the nut 25. Thus the spindle 22 may rotate freely within the horizontal portion 21 and this spindle and the post 24 will be oscillated by means of the arm or lever 29 previously referred to.

This arm or lever 29 is curved and extends out forwardly and laterally beneath the reflector 32 which is mounted upon the post 24. The end of this lever is pivotally connected to a link 33, this link 33 at its other end being pivotally connected to the extremity of a main lever 34. This main lever 34 has a straight portion 35 and a portion 36 which is angularly related to the upper portion, the link 33 being pivotally connected to the extremity of this angular portion 36. The part 34 is pivotally connected, as at 37, to the bracket 12 and the rear end of the lever 34 is pivotally connected to a cross rod 38. This cross rod 38 at its extremities is pivoted to the two levers 34 on opposite sides of the machine. Each cross rod is downwardly bowed in effect, the middle portion of the cross rod, however, being horizontal, as at 39, and being connected by upwardly and laterally inclined portions to horizontal extremities, which in turn are bifurcated to embrace the ends of the levers 34. This cross rod 38 is operatively connected to the usual spindle connecting rod 40 as, for instance, by means of the link 41, which link has a universal joint connection to the straight portion 39 of the cross bar or rod, and also a universal joint connection to the spindle connecting rod 40. While any form of universal joint might be used, I have illustrated the rod 39 carrying a clamp or rectangular block 42 in which there is disposed an angular wrist pin 43 which pivotally engages with a block carried upon the connecting rod 41. The same sort of a universal joint connection may be made in connecting the link 41 with the spindle connecting rod 40. I do not wish to be limited to this, however.

It is to be particularly noted that the brackets 17 and 12 are disposed at right angles to each other at all times and the length of the bracket 12 is the same as the length of the bracket 17.

The operation of this mechanism will be obvious from what has gone before. The cross coupling rod 39 will, of course, shift transversely with the shifting of the spindle connecting rod 40 and this, acting through the levers 35 and the links 33, will act to shift the levers or arms 29 and oscillate these levers or arms around the centers formed by the spindles 23. Inasmuch as the post 24 is set into the socket 26 formed in the end of the corresponding arm 29, it is obvious that the posts will be oscillated and, therefore, the headlights will be shifted in accordance with the turning of the wheels and the beams from the headlights will be directed at all times in line with the wheels no matter to what extent the wheels may be shifted or cramped.

It will be particularly noted that I have provided a double leverage system for oscillating the headlights, in that the headlight is connected to the lever 29, which in turn is connected to the lever 34.

I claim:—

1. In an automobile having a headlight bearing and a steering rod, a forwardly extending arm constituting a bracket and mounted upon the bearing, a headlight having a stem oscillatably mounted in the forward extremity of the arm, a lever mounted on the headlight bearing to one side of the point of connection of the bracket, links pivotally connected to each other, to the forward end of the lever and to the forward end of said arm supporting the headlight, and means connecting the rear end of the lever to the steering rod of the machine.

2. An automobile headlight including a supporting bracket fixed to the vehicle frame and extending laterally therefrom, an upwardly arcuate supporting bracket also mounted upon the vehicle frame and disposed at right angles to the first named bracket and extending forwardly, the second named bracket at its outer end being formed with a horizontal portion, a lamp post having a spindle extending through its horizontal portion and oscillatable therein, a lever resting at one end upon the horizontal portion of the bracket and having a socket in its upper face, the lamp post having a shoulder fitting in said socket whereby the lever and lamp post shall oscillate together, said lever being forwardly curved, a second lever pivoted to the first named bracket and having its forward end angularly bent, a link connecting the forward extremities of the two levers, and a transversely extending connecting rod pivotally connected at one end to the rear end of the second named lever and having means whereby it may be connected to the spindle connecting rod of the machine.

3. The combination with an automobile having a transversely extending fender brace formed to provide a horizontal headlight bearing, a bracket attached to said bearing and extending laterally therefrom, a second bracket upwardly bowed and having one end inserted through the horizontal portion of the fender brace and extending forward at right angles to the first named bracket, the second bracket at its end having a horizontal portion, a lamp post having a spindle extending downward through said horizontal portion, a lever having its rear end resting upon the horizontal portion of the second named bracket and having a rectangular socket in its upper face, the lamp post having a shoulder fitting said socket, the lever being forwardly and laterally curved, a second lever pivoted to the first named bracket and having a portion extending parallel to the second named bracket and a portion angularly disposed with reference thereto and extending downward and forward, a link pivotally connecting the extremities of said levers, and a connecting rod pivotally connected to the rear end of the second named lever and adapted to be connected to the spindle connecting rod of the machine.

4. The combination with an automobile having downwardly and laterally inclined fender supporting braces, each having a horizontal portion, of dirigible headlights therefor comprising upwardly bowed brackets, each bracket at its rear end being inserted through the corresponding horizontal portion of the fender support, a pair of laterally disposed brackets having a web extending beneath the horizontal portions of the fender supports and through which the ends of the upwardly bowed brackets pass, said laterally extending brackets each having an inclined face bearing against the inclined face of the fender support, the upwardly bowed bracket terminating at its forward end in a horizontal portion, a pair of lamps each having a lamp post terminating in a downwardly extending spindle extending through the horizontal portion of each bowed bracket, the lower end of the spindle being screw-threaded, a nut thereon, a pair of levers, one for each lamp post, each lever being outwardly and forwardly curved and each lever at its rear end resting upon the horizontal portion of the corresponding bowed bracket and having its upper face formed with an angular recess, the corresponding lamp post having a shoulder fitting in said recess, levers pivoted each to the outer ends of the laterally projecting first named brackets, each lever having a rear portion extending parallel to the line of draft and the forward portion forwardly and laterally angled, links pivotally connecting the extremities of the levers, a connecting rod connecting the rear ends of the second named levers, the connecting rod being downwardly bowed, a link having a universal joint connection to said connecting rod, and a wheel spindle connecting rod with which the link is connected by a universal joint.

In testimony whereof I hereunto affix my signature.

IRA E. PINE.